United States Patent [19]

Shigeki et al.

[11] Patent Number: 4,958,789
[45] Date of Patent: Sep. 25, 1990

[54] HOSE FITTING FIXING CONSTRUCTION

[75] Inventors: Terumitsu Shigeki, Nagoya; Kenichi Mitsui, Ichinomiya, both of Japan

[73] Assignee: Toyoda Gosei Co., Ltd., Nishikasugai, Japan

[21] Appl. No.: 323,409

[22] Filed: Mar. 14, 1989

[30] Foreign Application Priority Data

Mar. 31, 1988 [JP]  Japan .................................. 63-43378
Jul. 5, 1988 [JP]  Japan .................................. 63-89367

[51] Int. Cl.$^5$ ............................................... F16L 5/00
[52] U.S. Cl. .......................................... 248/56; 285/39; 285/62; 285/256; 285/906
[58] Field of Search .................... 285/60, 39, 61, 62, 285/63, 64, 256, 906; 248/56

[56]  References Cited

U.S. PATENT DOCUMENTS

| | | | |
|---|---|---|---|
| 3,171,946 | 3/1965 | Ammerman | 246/56 X |
| 3,197,615 | 7/1965 | Wetlesen | 248/56 X |
| 4,674,719 | 6/1987 | Tanioka et al. | 285/62 X |
| 4,840,408 | 6/1989 | Nishiki et al. | 285/56 X |

FOREIGN PATENT DOCUMENTS 59-6310  2/1984  Japan .
60-17890  11/1985  Japan .

*Primary Examiner*—Dave W. Arola
*Attorney, Agent, or Firm*—Cushman, Darby & Cushman

[57]  ABSTRACT

In a hose fitting fixing construction according to this invention, an engagement member having restoring force of gravity or elastic force is disposed in an engagement space of a bracket. The engagement member engages with an engagement dent of a hose fitting flange inserted into the engagement space, thereby engaging the hose fitting flange with the bracket. A detachment hole may be provided on the bracket to enable easy detachment of the hose fitting flange from the bracket. A detachment jig is inserted into the detachment hole to deform the engagement member against the restoring force and disengage the engagement member from the engagement dent of the hose fitting flange, thereby enabling to detach the hose fitting flange from the engagement space. Accordingly, the hose fitting flange can be installed to the bracket by snap-action even in a limited work space, and detached with ease.

13 Claims, 7 Drawing Sheets (PRIOR ART)

HOSE FITTING FIXING CONSTRUCTION

BACKGROUND OF THE INVENTION

1. Field of the Invention

This invention relates to a hose fitting fixing construction for piping. A hose fitting fixing construction of this invention may be employed when detachably installing a hose assembly to an automobile body.

2. Description of the Prior Art

A hose fitting fixing construction employing a hose fitting, which comprises an engagement portion and a sleeve, has been disclosed as a retainer for retaining an intermediate portion of a hose in Japanese Examined Utility Model Publication (KOKOKU) No. 6310/1984.

As shown in FIGS. 18 and 19, the hose fitting fixing construction employs a hose fitting 200 comprising a cylindrical engagement portion 210 and a sleeve 220 extending from the engagement portion 210 in the axial direction. The engagement portion 210 has a flange portion 211 and a clip groove 212. After a hose 102 has been inserted into the sleeve 220, the sleeve 220 is crimped to fix the hose 102 therein. Then, the hose fitting 200 is inserted into an installation hole of a bracket 400 at the engagement portion 210 disposed opposite to the sleeve 220. After the flange 211 has been brought into contact with the bracket 400 and positioned, a spring clip 500 is placed in the clip groove 212 to hold and retain the bracket 400 with the flange 211 and spring clip 500.

However, when assembling the above hose fitting fixing construction, the spring clip 500 should be placed in the clip groove 212 with one hand while pressing the hose fitting 200 onto the bracket 400 with the other hand. Thus, the assembling operation should be done with two hands. Work efficiency of the assembling operation in a limited work space has been bad because the assembling operation should be done with two hands and size of the spring clip is usually small. Manhour requirement has been also increased because high dimensional accuracy has been required for machining the clip groove or the like. In addition, when detaching the hose fitting 200 from the bracket 400, the hose 102 fixed in the hose fitting 200 should be pulled out of the bracket 400 after removing the spring clip 500. Thus, the detaching operation has been cumbersome.

Another hose fitting fixing construction has been known, in which a flange of a hose fitting extending from a sleeve in a radial direction is fixed to a bracket with a bolt and a nut. This hose fitting fixing construction allows easy installation and detachment even when a hose is fixed. However, it is a hard work to assemble the hose fitting fixing construction with a bolt and a nut in a limited work space, and it is impossible to install the hose fitting fixing construction by snap-action.

SUMMARY OF THE INVENTION

It is an object of this invention to provide a hose fitting fixing construction easily installable by snap-action.

It is another object of this invention to provide a hose fitting fixing construction easily detachable with a detachment jig.

A hose fitting fixing construction of this invention comprises a hose fitting comprising a cylindrical sleeve into which a hose is inserted and a plate-shaped flange having an engagement dent and extending from an outer peripheral surface of the sleeve in a radial direction; a plate-shaped bracket extending from a mounting portion and having an engagement space into which the flange is inserted; and an engagement member disposed in the engagement space and having restoring force of gravity or elastic force for maintaining a predetermined shape. It is a feature of the hose fitting fixing construction that the flange is inserted into the engagement space against the restoring force, the engagement member is restored by the restoring force at the engagement dent and engaged with the engagement dent, and the flange and bracket are engaged by the engagement of the engagement dent and the engagement member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 (b) is a sectional view of the hose fitting fixing construction of the first preferred embodiment under installation;

FIG. 3 (c) is a sectional view of the hose fitting fixing construction of the first preferred embodiment under installation;

DETAILED DESCRIPTION OF THE INVENTION

Figure 1:
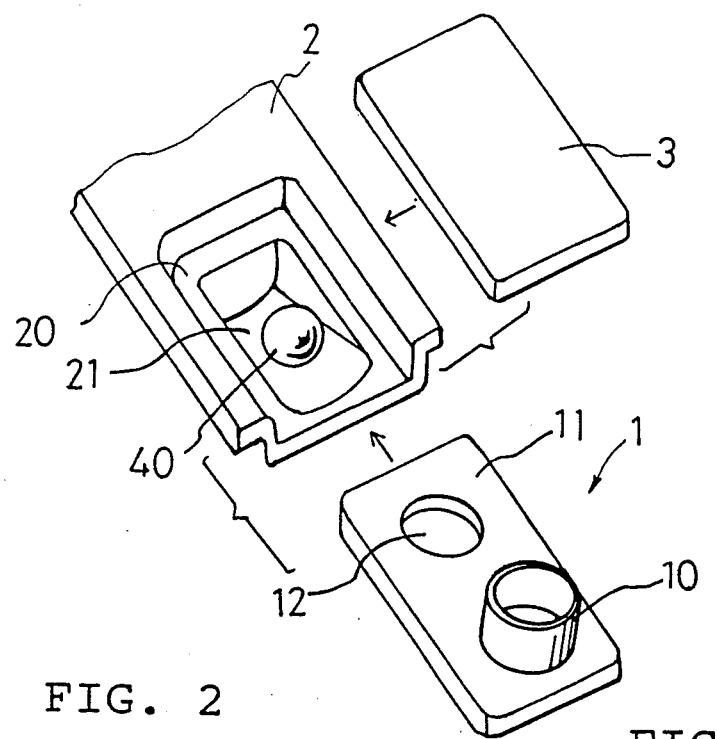
FIG. 1 is a perspective view illustrating an arrangement of a hose fitting fixing construction of a first preferred embodiment according to this invention.

A hose fitting fixing construction of this invention comprises a hose fitting, a bracket and an engagement member.

The hose fitting comprises a sleeve and a flange. A hose is inserted into the sleeve, and fixed by crimping or bonding. The hose may be inserted into the sleeve from either of the ends. The sleeve may be provided at one end of the flange or at both ends thereof, and an end fitting may be provided at a side opposite to the side provided with the sleeve. In addition, an inner cylinder may be inserted into the hose, and hold the hose between itself and the sleeve. The inner cylinder may be formed integrally with or independently of the hose fitting.

The bracket extends from a mounting portion of an automobile or the like, and has an engagement space into which the flange is inserted. The engagement space may be formed integrally when forming the bracket, or a housing cover as the engagement space and a plate bracket may be separately formed and the housing cover may be fixed on the plate bracket. Further, a plate cover may be fixed on a bracket having a dent portion forming the engagement space.

One of the features of this invention is that an engagement member is disposed in the engagement space of the bracket and the engagement member engages with an engagement dent of the flange inserted into the engagement space to engage the flange with the bracket.

The engagement dent may be a dent, a cut-off or a through hole formed on the flange. The dent may be formed so as to spread in the thickness direction of the flange or it may be disposed on a side surface of the flange.

As far as the engagement member engages with the engagement dent and it has restoring force of gravity or elastic force for maintaining a predetermined shape, the shape of the engagement member is not specified in particular. The engagement member may be formed in a plate spring, a steel ball or a roller as later described in preferred embodiments.

Moreover, it is preferred to provide an urging member at an upper portion of the engagement space. The urging member urges the flange downward when the flange engages with the bracket. In this way, the flange is held by the engagement member and the urging member and prevented from getting rickety.

The hose fitting fixing construction of this invention may be modified by forming a detachment hole on the bracket so that the engagement between the engagement dent and the engagement member is made detachable. The engagement dent of the flange is disengaged from the engagement member of the bracket by inserting a detachment jig into the detachment hole and then by elastically deforming the engagement member against the elastic force. The detachment hole is disposed at a position facing an engaging portion of the engagement member. A detachment jig of a rod shape, for instance, is inserted into the detachment hole to elastically deform and disengage the engagement member from the engagement dent by pressing. Thus, the flange can be taken out of the engagement space with ease.

In the hose fitting fixing construction of this invention, a hose is first inserted into and fixed in the sleeve of the hose fitting. Then, the flange of the hose fitting is inserted into the engagement space of the bracket. At this moment, the engagement member is pressed with the flange, and displaced or deformed elastically. Accordingly, a path allowing the flange insertion is made and the insertion continues. Pressing force exerted on the flange against the engagement member is released or diminishes at the engagement dent, and the engagement member is engaged with the engagement dent by the restoring force. As a result, the flange is engaged with the bracket by the engagement between the engagement dent and the engagement member, and the hose assembly installation has been completed.

When the bracket is provided with the detachment hole, the engagement between the engagement dent and the engagement member is disengaged by inserting the detachment jig into the detachment hole and then by elastically deforming the engagement member against the elastic force. The engagement member is disengaged from the engagement dent, and the flange is freed from the engagement with the engagement member. The flange can be thus taken out of the engagement space.

The hose fitting fixing construction of this invention thus enables snap-action hose assembly installation with one hand, because the hose assembly can be installed simply by inserting the flange of the hose fitting in the engagement space of the bracket. Further, when the bracket is provided with the detachment hole, the hose fitting can be disassembled easily from the bracket by inserting the detachment jig into the detachment hole and by pressing with the detachment jig.

DETAILED DESCRIPTION OF THE PREFERRED EMBODIMENTS

Having generally described this invention, a further understanding can be obtained by reference to certain preferred embodiments which are provided herein for purposes of illustration only and are not intended to be limiting unless otherwise specified.

First Preferred Embodiment

Figure 2:
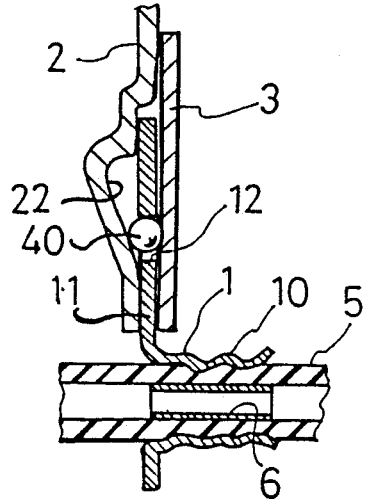
FIG. 2 is a sectional view of the hose fitting fixing construction of the first preferred embodiment.
Figure 3A:
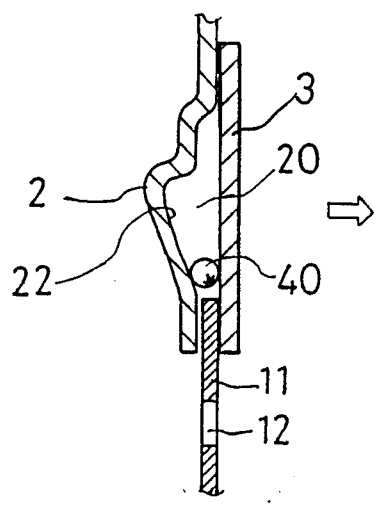
FIG. 3 (a) is a sectional view of the hose fitting fixing construction of the first preferred embodiment under installation.
Figure 3B:
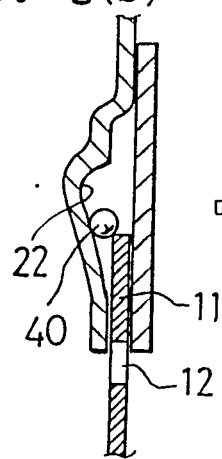
Figure 3C:
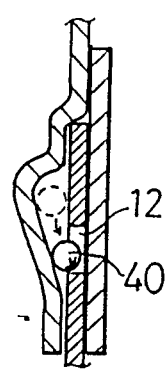
Figure 5:
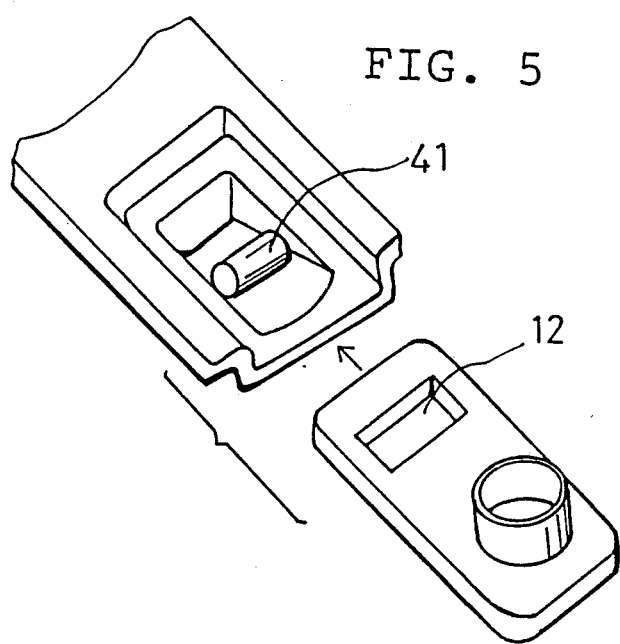
FIG. 5 is a perspective view of another modification on the hose fitting fixing construction of the first preferred embodiment.

FIGS. 1 through 3 illustrate a hose fitting fixing construction of a first preferred embodiment according to this invention. This hose fitting fixing construction comprises a hose fitting 1 into which a hose is inserted, a bracket 2 extending vertically from an automobile body, a cover member 3 and a steel ball 40 as an engagement member.

The hose fitting 1 comprises a cylindrical sleeve 10, a plate-shaped flange 11 disposed at one end of the sleeve 10 and extending from outer periphery surface of the sleeve 10 in a radial direction of the sleeve 10. A through hole 12, i.e. an engagement dent, having a diameter larger than a diameter of the steel ball 40 is formed on the flange 11. A hose 5 is inserted into the sleeve 10, and an inner cylinder 6 is inserted into the hose 5. The hose 5 is held and fixed firmly with the sleeve 10 and the inner cylinder 6 by crimping the sleeve 10 inwardly at a position where the inner cylinder 6 is placed.

An engagement space 20 is formed at a lower portion on the bracket 2. This engagement space 20 has an inner shape slightly larger than an outer shape of the flange 11 so as to accommodate the flange 11. Further, a housing 21 denting by one more step is formed in the engagement space 20. A bottom surface of the housing 21 forms a slanting surface having the largest depth at the top end and the smallest depth at the bottom end. The steel ball 40 is placed rollably in the engagement space 20 and the housing 21. The cover member 3 is welded on the bracket 2 to cover the engagement space 20 and prevent the steel ball 40 from falling down before inserting the flange 11.

When installing the hose fitting 1 to the bracket 2, first the flange 11 is inserted into the engagement space 20 at the bottom end of the bracket 2. FIG. 3 (a) illustrates the moment when the flange 11 is inserted into the engagement space 20. The steel ball 40 is rolled down on the slanting surface 22 by the gravity, i.e. restoring force, and placed in the engagement space 20 in a manner held with the bracket 2 and the cover member 3.

When the flange 11 is further inserted as illustrated in FIG. 3 (b), the steel ball 40 is pushed up by the end of flange 11. The steel ball 40 ascends on the slanting surface 22 while opposing the gravity or restoring force. Then, when the end of the flange 11 is brought into contact with the top inner surface of the engagement space 20 as illustrated in FIG. 3 (c), the steel ball 40 is rolled down on the slanting surface 22 by the restoring force and gets in the through hole 12. Finally, when the force pressing up the flange 11 is released, the hose fitting 1 attempts to fall down by the gravity, but the steel ball 40 is fixed at the position where the steel ball 40 is held between the bracket 2 and the cover member 3 as illustrated in FIG. 2, thereby bringing the steel ball 40 into contact with the upper inner surface of the through hole 12 to engage the flange 11 with the bracket 2. Thus, the hose fitting 1 has been installed to the bracket 2.

Consequently, in the hose fitting fixing construction of the first preferred embodiment, the hose fitting 1 can be installed to the bracket 2 by snap-action, i.e. by only inserting the flange 11 of the hose fitting 1 in the engagement space 20 of the bracket 2 from the bottom to the top. The inserting of the flange 11 is smooth because only rolling friction due to rolling of the steel ball 40 is exerted and thus resistance force against the inserting is extremely small. When the hose fitting fixing construction is assembled, movement of the hose fitting 1 in the axial direction of the hose 5 is restricted with the bracket 2 and the cover member 3, and another movement perpendicular to the axial movement is restricted by bringing both sides of the flange 11 into contact with the inner surfaces of bracket 2 defining the engagement space 20. When disassembling the hose fitting fixing construction, the hose fitting 1 is detached from the bracket 2 after removing the cover member 3 from the bracket 2.

Figure 4:
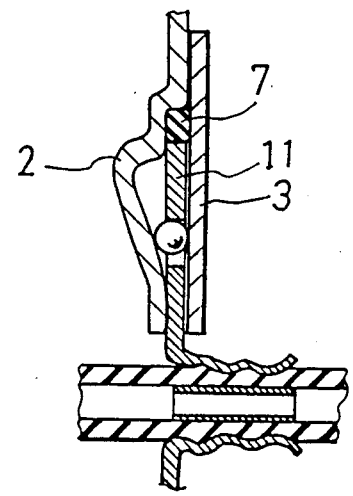
FIG. 4 is a sectional view of a modification on the hose fitting fixing construction of the first preferred embodiment.

In addition, it is preferable to dispose a rubber member 7 at a position between the top end of the flange 11 and the bracket 2 as illustrated in FIG. 4. In this way, the flange 11 is urged downward by elastic force of the rubber member 7, thereby preventing the flange 11 from moving upward. As a result, the hose fitting 1 is further prevented from being disengaged from the bracket 2. Although the steel ball 40 is employed by the hose fitting fixing construction of the first preferred embodiment, the same operation and advantages can be obtained by employing a cylindrical roller 41. It is a matter of course that the through hole 12 is made to a shape agreeing with a shape of the roller 41.

Second Preferred Embodiment

Figure 6:
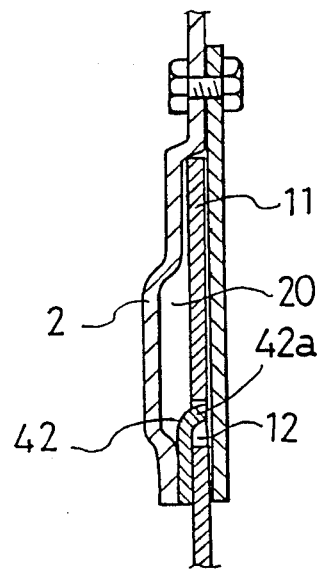
FIG. 6 is a sectional view of a hose fitting fixing construction of a second preferred embodiment according to this invention.

FIG. 6 illustrates a hose fitting fixing construction of a second preferred embodiment according to this invention. The hose fitting fixing construction employs a plate spring 42, i.e. an engagement member, made of spring steel. The plate spring 42 comprises a bent end having a substantially L-shaped cross section, and is fixed on the bracket 2 so that the bent end sticks out in the engagement space 20. This end of the plate spring 42 is a first engagement portion 42a, and the first engagement portion 42a engages with the through hole 12, i.e. an engagement dent, of the flange 11.

In this hose fitting fixing construction, when the flange 11 is inserted in the engagement space 20, the plate spring 42 is pressed by the end of the flange 11, and is deformed elastically so that the plate spring 42 approaches the inner surface of the bracket 2, thereby enabling the inserting of the flange 11 into the engagement space 20. The flange 11 is elastically brought into contact with the plate spring 42 when inserted. The plate spring 42 is warped back in an arc shape by the restoring force at the through hole 12, and the first engagement portion 42a, i.e. the end of the plate spring 42, gets in and engages with the through hole 12. Thus, the flange 11 of the hose fitting 1 has been installed to the bracket 2.

The bracket 2 is made in a substantially perpendicular manner in the hose fitting fixing construction of the first preferred embodiment, so that the steel ball 40 rolls with ease. This is because the restoring force of the gravity is utilized in the first preferred embodiment. However, the disposing direction of the bracket 2 is not limited thereto in the hose fitting fixing construction of the second preferred embodiment, and a greater freedom for the disposing direction has been available from the hose fitting fixing construction of the second preferred embodiment, because the elastic force of the plate spring 42 is utilized as the restoring force.

Third Preferred Embodiment

Figure 7:
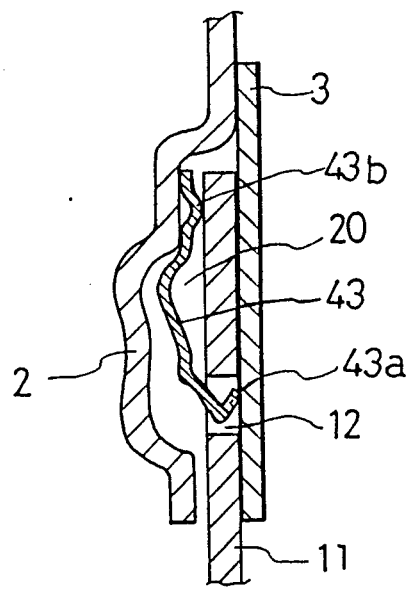
FIG. 7 is a sectional view of a hose fitting fixing construction of a third preferred embodiment according to this invention.
Figure 8:
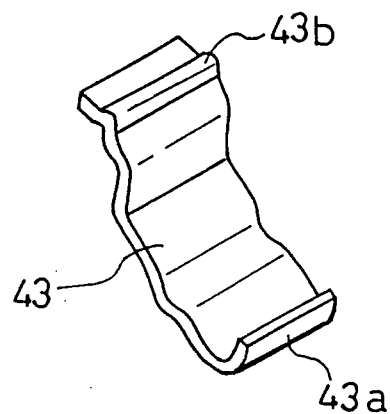
FIG. 8 is a perspective view of an engagement member employed for the hose fitting fixing construction of the third preferred embodiment.

A hose fitting fixing construction of a third preferred embodiment has the same arrangements as those of the second preferred embodiment except a configuration of a plate spring 43. As illustrated in FIGS. 7 and 8, the plate spring 43 is made of spring steel and formed in a plate bent at several portions thereof. The plate spring 43 has a cross section of a substantially dogleg shape, a first engagement portion 43a formed at one end and having a substantially L-shaped cross section, and a second engagement portion 43b formed at a position adjacent to the other end. The plate spring 43 is disposed in an engagement space 20 so as to face the first engagement portion 43a to the flange 11 inserted in the engagement space 20.

In the hose fitting fixing construction of the third preferred embodiment, the flange 11 is inserted into the engagement space 20 while elastically deforming and bringing the plate spring 43 into contact with a surface of the flange 11 in a manner similar to that of the hose fitting fixing construction of the second preferred embodiment. Finally, the first engagement portion 43a is sprung back by the restoring force of the elasticity and is engaged with the through hole 12. On the other hand, the second engagement portion 43b is elastically brought into contact with an end portion of the flange 11, and the flange 11 is pressed on the cover member 3 in turn. Thus, the hose fitting fixing construction of the third preferred embodiment avoids rickety assembly, and, at the same time, effects the same operation and advantages as those of the second preferred embodiment.

Fourth Preferred Embodiment

Figure 9:
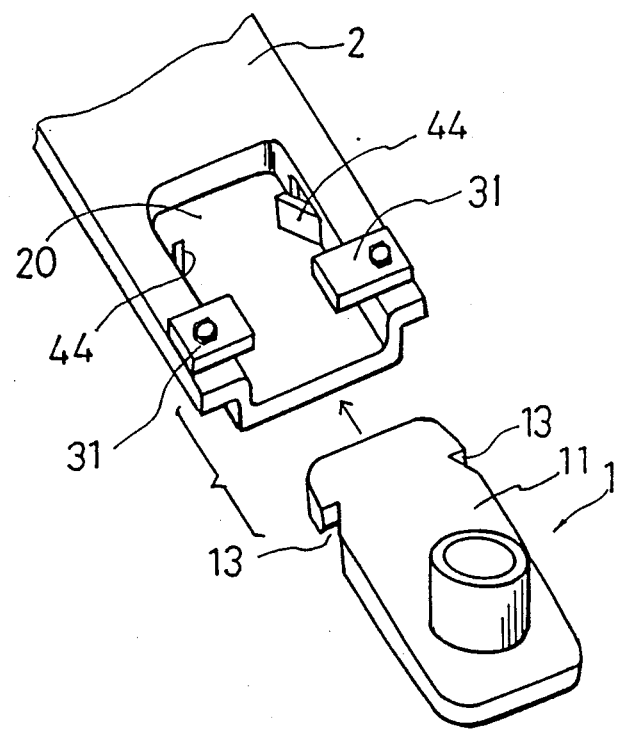
FIG. 9 is a perspective view of a hose fitting fixing construction of a fourth preferred embodiment according to this invention.
Figure 10:
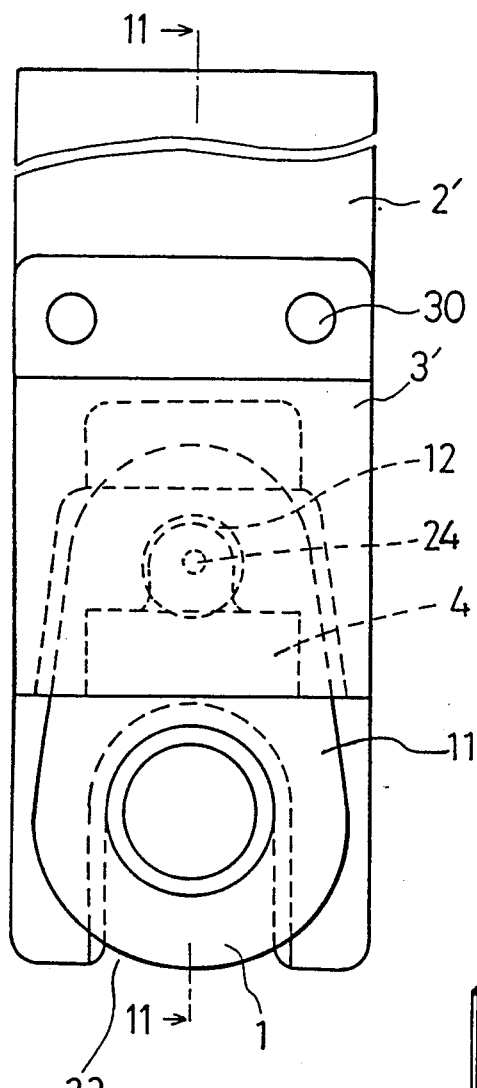
FIG. 10 is a front view of a hose fitting fixing construction of a fifth preferred embodiment according to this invention.

FIG. 9 illustrates a hose fitting fixing construction of a fourth preferred embodiment according to this invention. The hose fitting fixing construction comprises a hose fitting 1 comprising a flange 11 having cut-offs 13 and 13, i.e. the engagement dent, formed on both sides of the flange 11, and a bracket 2 comprising an engagement space 20 having claws 44 and 44, i.e. the engagement member, cut and erected on both sides of the engagement space 20. Further, a pair of stoppers 31 and 31 are fixed on the bracket 2 with screws to prevent the hose fitting 1 from falling down.

In the hose fitting fixing construction of the fourth preferred embodiment, when the flange 11 is inserted into the engagement space 20, the claws 44 and 44 is deformed elastically and sprung back later to engage with the cut-offs 13 and 13 in a manner similar to that of the hose fitting fixing construction of the second preferred embodiment. Number of component parts has been reduced in the hose fitting fixing construction of the fourth preferred embodiment because the engagement member is made out of the bracket 2 by cutting and erecting the claws 44 and 44.

Fifth Preferred Embodiment

FIGS. 10 through 15 illustrate a hose fitting fixing construction of a fifth preferred embodiment according to this invention. In this hose fitting fixing construction, a cover member 3' fixed on a plate-shaped bracket 2' instead of the cover member 3 described above. An engagement member 4 is fixed on an inner surface of the cover member 3', and one end of the engagement member 4 sticks out in an engagement space 32 defined by the plate-shaped bracket plate 2' and the cover member 3'.

The plate-shaped bracket 2' has a cut-off 23 formed at a lower end thereof. The cut-off 23 has a width approximately equal to an outer diameter of the sleeve 10 of the hose fitting 1. The cut-off 23 restricts horizontal movements of the hose fitting 1 when the sleeve 10 of the hose fitting 1 is placed therein. Further, a detachment hole 24 is formed at a position on the plate-shaped bracket 2'. The detachment hole 24 is disposed substantially in front of a free end of the engagement member 4 later described.

The cover member 3' has a shape substantially of a housing, but does not have either of side walls. The cover member 3' is fixed on the plate-shaped bracket 2' with rivets 30 so as to face its container-shaped inner surface to the plate-shaped bracket 2'. The engagement space 32 having an opening at an end adjacent to the cut-off 23 is defined by the plate-shaped bracket 2' and the cover member 3'. This engagement space 32 has an inner configuration slightly larger than an outer configuration of the flange 11, and allows the inserting of the flange 11 at the opening.

An end of the engagement member 4 made of spring steel is fixed on the cover member 3', the other end of the engagement member 4 sticks out in the engagement space 32. The other end of the engagement member 4 is the free end, and engages with the through hole 12 of the flange 11 to prevent the flange 11 from coming off the engagement space 32. Portions of the cover member 3' facing to the engagement member 4 are made thinner than the other portions. Thus, the flange 11 can be inserted between the plate-shaped bracket 2' and the engagement member 4 even when the free end of the engagement member 4 is pressed onto the cover member 3'.

Figure 11:
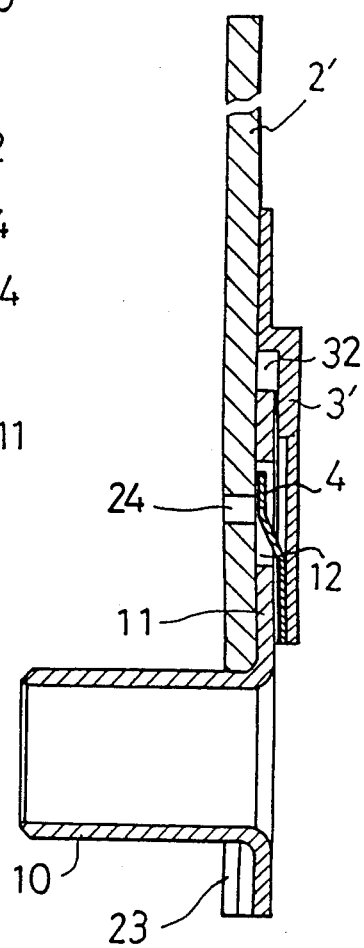
FIG. 11 is a sectional view taken along line A—A of FIG. 10.
Figure 12:
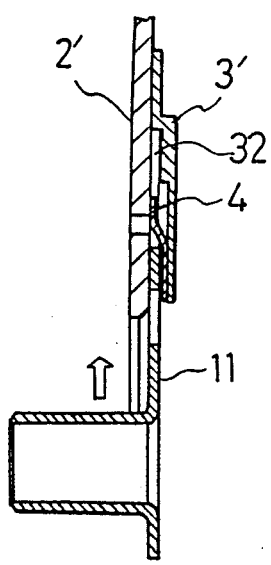
FIG. 12 is a sectional view of the hose fitting fixing construction of the fifth preferred embodiment under installation.
Figure 13:
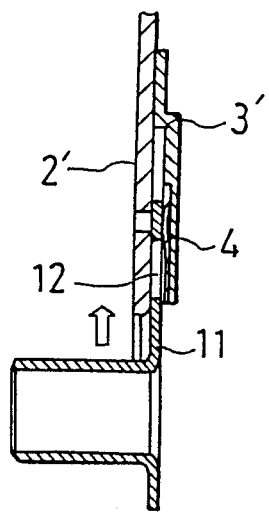
FIG. 13 is a sectional view of the hose fitting fixing construction of the fifth preferred embodiment under installation.

When installing the hose fitting 1 to the bracket 2', first the flange 11 is inserted into the engagement space 32. FIG. 12 illustrates the moment when the flange 11 is inserted into the engagement space 32. When the flange 11 is further inserted into the engagement space 32, the flange 11 presses the free end of the engagement member 4 and elastically deforms the engagement member 4 so that the engagement member 4 approaches the cover member 3' as illustrated in FIG. 13. The flange 11 is thus allowed to go further up in the engagement space 32. When the flange 11 is inserted and the through hole 12 of the flange 11 coincides with the free end of the engagement member 4, the engagement member 4 deforms back due to its elastic force so that the free ends of the engagement member 4 protrudes to the plate-shaped bracket 2' and engages with the through hole 12. FIG. 11 illustrates the moment when the free ends of the engagement member 4 protrudes in and engages with the through hole 12 of the flange 11. The free end of the engagement member 4 comes into contact with periphery walls of the through hole 12, thereby holding the flange 11 in the engagement space 32 and preventing the flange 11 coming off the engagement space 32. In this fixing state, a movement of the hose fitting 1 in an axial direction of the sleeve 10 is prevented with the plate-shaped bracket 2' and the cover member 3', and a movement perpendicular to the axial direction movement is prevented by bringing the sleeve 10 into contact with the periphery walls of the cut-off 23.

Figure 14:
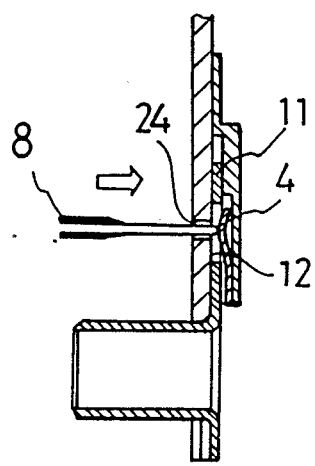
FIG. 14 is a sectional view of the hose fitting fixing construction of the fifth preferred embodiment under detachment.
Figure 15:
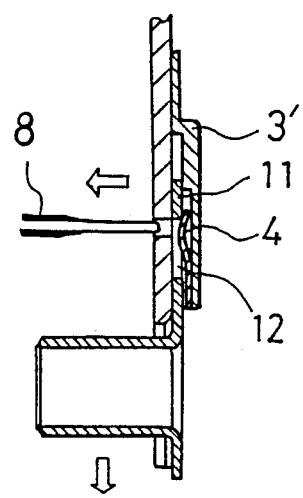
FIG. 15 is a sectional view of the hose fitting fixing construction of the fifth preferred embodiment under detachment.

When detaching the flange 11 from the engagement space 32, a rod-shaped detachment jig 8 is inserted into the detachment hole 24 as illustrated in FIG. 14. The free end of the engagement member 4 can be deformed elastically by pressing with the rod-shaped detachment jig 8 because the detachment hole 24 faces to the free end of the engagement member 4. The hose fitting 1 is moved slightly in a detaching direction, i.e. downward in the figure, while pressing and deforming the free end of the engagement member 4, the free end of the engagement member 4 disengages from the through hole 12 and comes in contact with an end of the flange 11 as illustrated in FIG. 15. Accordingly, the flange 11 ca be detached from the engagement space 32 in the downward direction opposite to the direction illustrated in FIG. 13, because the engagement member 4 is kept pressed and deformed with the end of the flange 11 even when the detachment jig 8 is removed from the detachment hole 24.

Sixth Preferred Embodiment

Figure 16:
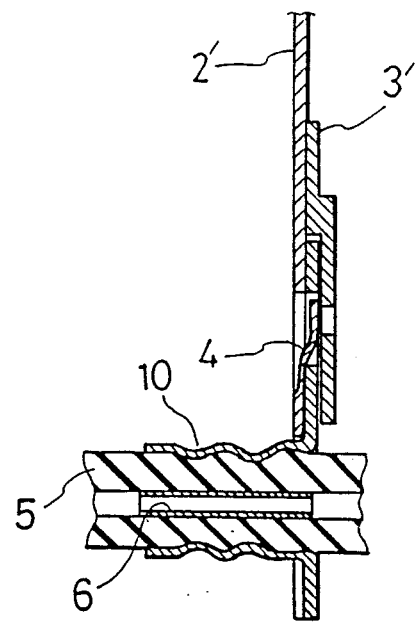
FIG. 16 Is a sectional view of a hose fitting fixing construction of a sixth preferred embodiment according to this invention.

FIG. 16 illustrates a hose fitting fixing construction of a sixth preferred embodiment. In this hose fitting fixing construction, a plate-shaped bracket 2' made of spring steel is cut out at a portion in a U-shape substantially, and the cut out portion is made an engagement member 4 by bending so as to stick out to the cover member 3'. A detachment hole 24 is formed on the cover member 3' in this hose fitting fixing construction. Further, as illustrated in FIG. 16, an inner cylinder 6 is inserted into the hose 5, the hose 5 is inserted into the sleeve 10 of the hose fitting 1, and the sleeve 10 is crimped to fix the hose 5 in the hose fitting 1 in this hose fitting fixing construction. Except these arrangements, the sixth preferred embodiment has arrangements similar to those of the fifth preferred embodiment.

Although the engagement member 4 of the sixth preferred embodiment is deformed and moved in a direction opposite to that of the fifth preferred embodiment, the hose fitting 1 of the sixth preferred embodiment is made detachable by operation similar to that of the fifth preferred embodiment.

Seventh Preferred Embodiment

Figure 17:
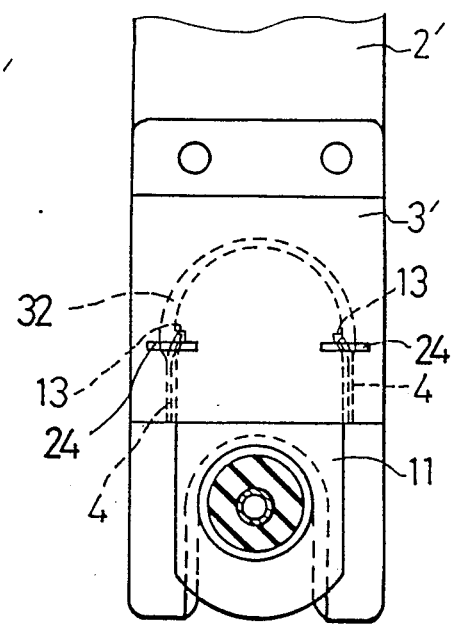
FIG. 17 is a front view of a hose fitting fixing construction of a seventh preferred embodiment according to this invention.
Figure 18:
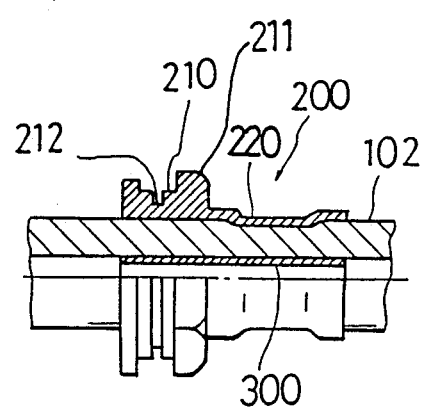
FIG. 18 is a side view, partially in section, of a hose fitting employed for a conventional hose fitting fixing construction.
Figure 19:
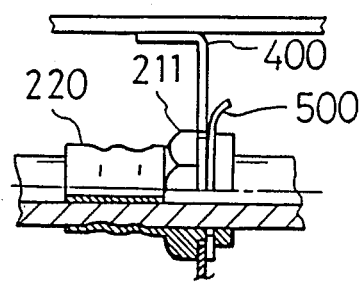
FIG. 19 is a side view, partially in section, of the conventional hose fitting fixing construction.

FIG. 17 illustrates a hose fitting fixing construction of a seventh preferred embodiment. In this hose fitting fixing construction, an end of a flange 11 is formed in an arc-taper shape, and cut-offs 13 and 13, i.e. engagement dents, are formed on both side surfaces of the end of the flange 11 at ends of the arc-taper shape. Engagement members 4 and 4 are respectively fixed on inner surfaces of a cover member 3' facing to the both side surfaces of the end of the flange 11 at ends of the arc-taper shape, and provided so as to stick their free ends into an engagement space 32. Detachment holes 24 and 24 are respectively formed on the cover member 3' at positions meeting the free ends of the engagement members 4 and 4. Other than these arrangements, the seventh preferred embodiment has arrangements similar to those of the sixth preferred embodiment.

In the hose fitting fixing construction of the seventh preferred embodiment, the engagement members 4 and 4 are pressed and deformed with the arc-taper shape end of the flange 11 when the flange 11 is inserted into the engagement space 32. The engagement members 4 and 4 are then sprung back at the positions of the cut-offs 13 and 13 by elastic force to engage with the cut-offs 13 and 13. Thus, the hose fitting 1 is installed to a plate-shaped bracket 2' by snap-action.

When a detachment jig is inserted into the detachment holes 24 and 24 to deform the engagement members 4 and 4 simultaneously, the engagement members 4 and 4 are disengaged from the cut-offs 13 and 13. Accordingly, the hose fitting 1 can be detached from the plate-shaped bracket 2' by operation similar to that of the fifth preferred embodiment.

Having now fully described the invention, it will be apparent to one of ordinary skill in the art that many changes and modifications can be made thereto without departing from the spirit or scope of the invention as set forth herein.

What is claimed is:

1. A hose fitting fixing construction comprising:
   a hose fitting comprising a cylindrical sleeve for receiving a hose and a plate-shaped flange having an engagement dent defined therein, said flange extending radially from an outer peripheral surface of said sleeve;
   a plate-shaped bracket extending from a mounting portion, said bracket defining an engagement space for slidably receiving said flange; and
   an engagement member disposed in said engagement space of said bracket, said bracket, engagement space and engagement member being so constructed and arranged that said engagement member is disposed in said space so as to be movable therewithin but confined to said engagement space, said engagement member being sized and shaped and disposed within said engagement space so as to be engagable with said engagement dent of said flange when said flange is inserted into said engagement space, thereby retaining said flange in said bracket by cooperative engagement of said engagement dent, engagement member and said bracket.

2. A hose fitting fixing construction according to claim 1, wherein said bracket comprises a bracket body having a dent defined therein for forming a wall of said engagement space and a cover member covering at least a portion of said dent so as to define another wall of said engagement space.

3. A hose fitting fixing construction according to claim 2, wherein said engagement member is a steel ball disposed rollably in said engagement space, and said engagement dent in said flange is a through hole having an internal diameter larger than a diameter of said steel ball.

4. A hose fitting fixing construction according to claim 2, wherein said engagement member is a roller disposed rollably in said engagement space, and said engagement dent in said flange is a through hole having a configuration substantially corresponding to a central longitudinal cross-sectional configuration of said roller.

5. A hose fitting fixing construction according to claim 1 or 2, wherein said engagement member comprises at least one elastic member comprising a half-member fixed on one side wall of said bracket, and another half-member disposed in said engagement space of said bracket, extending to another side wall of said bracket which faces to said one side wall of said bracket and having a first engagement portion to be engaged with said engagement dent of said flange.

6. A hose fitting fixing construction according to claim 5, wherein said bracket is formed of elastic material having elastic restoring force, and said engagement member is formed integrally with said bracket by cutting and bending at a portion of said bracket.

7. A hose fitting fixing construction according to claim 5, wherein said bracket has a detachment hole at least at a position facing to said first engagement portion when said flange engages said bracket.

8. A hose fitting fixing construction according to claim 11, wherein said engagement member is deformed against elastic force by inserting a detachment jig into said detachment hole, thereby disengaging said bracket from said engagement dent and making said bracket detachable from said flange.

9. A hose fitting fixing construction according to claim 5, wherein said engagement member is a plate spring having said first engagement portion formed by bending an end of said another half-member.

10. A hose fitting fixing construction according to claim 9, wherein said engagement member further comprises a second engagement portion for pressing said flange onto said another side wall of said bracket by elastically coming into contact with said flange when said flange engages with said bracket.

11. A hose fitting fixing construction according to claim 9, wherein said engagement member comprises claw elements made by cutting and displacing at a portion on both lateral side surfaces of said bracket, and said engagement dent of said flange comprises cut-outs made by cutting a portion on both lateral side surfaces of said flange.

12. A hose fitting fixing construction according to claim 11, wherein an outer radial end of said flange has an arc-taper configuration.

13. A hose fitting fixing construction according to claim 1 or 2, wherein an urging member is disposed at an upper position of said engagement space for urging said bracket downward when said flange engages with said bracket, and thereby said urging member and said engagement member hold said flange between them.

* * * * *